(12) United States Patent
Moss

(10) Patent No.: US 6,370,820 B1
(45) Date of Patent: Apr. 16, 2002

(54) SELF-WATERING VERTICAL SUPPORTING PLANTER

(76) Inventor: Alvin Edward Moss, 3 Gushue Avenue, Mount Pearl NF (CA), A1N 2R2

( * ) Notice: Subject to any disclaimer, the term of this patent is extended or adjusted under 35 U.S.C. 154(b) by 0 days.

(21) Appl. No.: 09/494,453

(22) Filed: Jan. 31, 2000

(51) Int. Cl.[7] .............................................. A01G 27/04
(52) U.S. Cl. .............................................. 47/81; 47/44
(58) Field of Search .............................. 47/79, 81, 47, 47/70, 44

(56) References Cited

U.S. PATENT DOCUMENTS

| | | | | |
|---|---|---|---|---|
| 1,227,105 A | * | 5/1917 | Barnes | |
| 1,974,367 A | * | 9/1934 | Schaible | |
| 2,072,185 A | * | 3/1937 | Schein | |
| 3,224,145 A | * | 12/1965 | Ballard | 47/81 |
| 3,676,953 A | * | 7/1972 | Delogne | 47/81 |
| 4,369,598 A | * | 1/1983 | Beckwith | 47/81 |
| 5,076,010 A | * | 12/1991 | Rollins | 47/81 |

FOREIGN PATENT DOCUMENTS

CA    2222187 A1  *  8/1999

* cited by examiner

Primary Examiner—Peter M. Poon
Assistant Examiner—Jeffrey L. Gellner

(57) ABSTRACT

A self-watering vertical supporting planter includes a growing medium cavity formed by the combination of outer and inner walls fixed to a bottom. The inner walls are fixed to a top and bottom forming a water reservoir with a centrally located sleeve to support a vertical telescopic support pole and pole cap fixed at its upper end. The reservoir is fixed to the bottom of the growing medium cavity. The reservoir has a filler hole and wick ports for self-watering of the growing medium. A plurality of strings are attached to the pole cap and the outer walls by means of hook-like elements fixed to the outer edges of the pole cap and the outer walls. The strings inclined with respect to the vertical form individual supports for vine type plants such as beans, tomatoes and cucumbers.

5 Claims, 5 Drawing Sheets

SELF-WATERING VERTICAL SUPPORTING PLANTER

CROSS-REFERENCE TO RELATED APPLICATION

Not applicable

STATEMENT REGARDING FEDERALLY SPONSORED RESEARCH OR DEVELOPMENT

Not applicable

REFERENCE TO MICROFICHE APPENDIX

Not applicable

BACKGROUND OF THE INVENTION

The present invention relates generally to a self-watering planter and more particularly to a vertical supporting planter having a growing medium cavity and a reservoir for watering the plants by capillary action. The reservoir has a centrally located support sleeve extending from the top of the reservoir through to the bottom of the reservoir to accommodate a telescopic support pole, and a plurality of strings for supporting vine type plants such as beans, peas, cucumbers and tomatoes.

Container gardening is a very popular method of gardening for backyards, decks, and balconies. This method of gardening is usually confined to smaller areas, limiting the number of containers that can be used and the number of plants that can be grown, or in areas where the natural soil is not suitable for growing plants. This method of gardening is particularly beneficial to gardeners who enjoy gardening but have a small amount of time to devote to it. There are many varieties of vine type plants suited to container gardening, some examples are beans, peas, cucumbers and tomatoes. It is logical that vine type plants will produce a far greater yield of fruit or vegetables in any given area than bush type plants would yield from the same area.

One of the problems encountered when growing in containers is supplying the growing medium with an adequate moisture level to provide good plant growth. This problem can be overcome by using self-watering planters. There are various types of self-watering planters on the market to choose from. Self-watering planters of this nature are usually small in size and will only accommodate a small number of plants. Also, planters of this nature do not have a vertical support mechanism to accommodate vine type plants such as beans, peas, cucumbers and tomatoes.

In some circumstances this can be overcome by placing the planters near a wall or fence for supporting the plants. Depending on the area, this could restrict the plants from getting a sufficient amount of sunlight for good plant growth. When a wall or fence is not available or suitable the only other alternative is to fabricate and secure supports to the planters. Finding the time and material to fabricate supports and secure them to the planters can sometimes cause a great deal of inconvenience U.S. Pat. No. 4,825,592, relates to stackable elongated perforated frames with the lowermost frame disposed into a plastic or ceramic pot filled with soil to hold the frame in an upright position. The stackable frames are filled with a growing medium to accommodate plants through apertures to furnish growth. As the plants start to mature and climb it is claimed that they will set new roots in the upper portions of the stackable frames, at which time the plants are severed and the frames are separated and placed in a new pot, and the plants are grown separately. The stackable frames are watered from the top of the uppermost stack with the water draining through the growing medium to the bottom of the lowermost stack.

Although the invention in Pat. No. 4,825,592 is a vertical plant support, it is not meant for growing vine type plants to maturity, such as beans, peas, cucumbers and tomatoes that will grow to heights of eight to nine feet. Nor does it have individual supports for supporting vine type plants such as beans, peas, cucumbers and tomatoes. These vine type plants need individual supports such as string supports for self-supporting themselves by their tendrils.

U.S. Pat. No. 4,123,873 relates to a cellular structure unit with upwardly converging walls being formed with an array of plant-receiving pockets closely juxtaposed in several rows for the growth of plants. This cellular structure is best suited for areas where there is limited space for the cultivation of plants such as small backyards, decks and balconies.

Although the planter in U.S. Pat. No. 4,123,873 is capable of growing a multitude of plants in confined spaces such as small backyards, decks and balconies, it is not self-watering and it is not suitable for growing self-supporting vine type plants such as beans, peas, cucumbers and tomatoes.

U.S. Pat. No. 5,276,997 relates to a vertical or columnar planter having a self-contained water distribution system, and a vertical elongated planter body having openings at intervals along the side walls of the elongated body for growing plants. This planter is also designed for growing plants in confined spaces such as small backyards, decks and balconies. However it does not have a vertical supporting mechanism for vine type plants, therefore it is not suitable for growing self-supporting vine type plants such as beans, peas, cucumbers and tomatoes.

Various types of self-watering upright or vertical planters have been developed with multiple growing locations positioned above one another along a continuous column of soil or other growing medium. These vertical or column planters having multiple growing locations positioned above one another mike them unsuitable for growing self-supporting vine type plants such as beans, peas, cucumbers and tomatoes. Other types of planters capable of growing vine type plants have to be positioned along a wall or fence to support the plants. Sometimes this can cause restricted sun light contributing to poor plant growth. Planters that are not in the vicinity of a wall or fence for plant support would need to have supports fabricated and secured to the planters. This could be a difficult task for gardeners especially when gardening on decks and balconies.

The present invention is a novel form of planter having an octagon shaped growing medium cavity surrounding an octagon shaped reservoir for watering the growing medium by means of capillary action. The bottom of the growing medium cavity is fixed to the reservoir. The reservoir has a centrally located sleeve for supporting a telescopic support pole and pole cap. A plurality of strings are looped from the hook-like elements on the pole cap to the hook-like elements on the outer walls of the growing cavity for supporting the vine type plants.

None of the inventions referred to in the U.S. Pat. Nos. 4,825,592, 4,123,873 and 5,276,997 are capable of growing and vertically supporting vine type plants such as beans, peas, cucumbers and tomatoes. The planter in the present invention is capable of growing vine type plants in a self-watered growing medium, and to provide support for the vine type plants by a plurality of strings attached to the pole cap and the outer walls of the planter.

The planter in the present invention can be easily converted in a matter of minutes to a small mesh, elongated octagon shaped net supported by the hook-like elements on the pole cap and the hook-like elements fixed to the outer walls of the reservoir. This conversion forms a support for growing vine type plants closely spaced such as peas. With this configuration there is ample space and growing medium to grow smaller plants adjacent to the peas, such as radishes, diminutive carrots and lettuce, etc.

The planter in the present invention has a novel means of protecting the plants from cold wind and low temperatures, by having a cone-shaped plastic or fabric covering to cover the plurality of strings supported by the hook-like elements on the outer walls of the planter and the hook-like elements on the outer edges of the pole cap. A space between the top of the plastic or fabric covering and the pole cap releases any build-up of heat. The plastic or fabric covering can be installed or removed when necessary in a matter of minutes by integral elastic bands at the top and bottom ends of the cone-shaped plastic or fabric cover. The elastic bands are supported by the hook-like elements on the pole cap and the hook-like elements on the outer walls of the planter.

BRIEF SUMMARY OF THE INVENTION

This present invention provides a novel form of self-watering vertical supporting planter having a growing medium cavity formed by the combination of outer and inner walls fixed to a bottom. The inner walls are fixed to a top forming a water reservoir for watering the growing medium by capillary action. The reservoir has a centrally located sleeve to accommodate and support a vertical telescopic support pole. The support pole has a pole cap fixed to its upper end, with a plurality of strings attached to the pole cap and the outer walls of the planter by means of hook-like elements fixed to the outer edges of the pole cap and the outer walls of the planter. The plurality of strings are inclined with respect to the vertical forming individual supports for vine type plants such as beans, cucumbers and tomatoes.

The present invention can convert to a small mesh, elongated octagon shaped net supported by the hook-like elements on the pole cap and the hook-like elements fixed to the outer walls of the reservoir. The net is inclined with respect to the vertical. This conversion forms a support for growing vine type plants closely spaced such as peas. With this configuration there is ample space and growing medium to grow smaller plants adjacent to the peas, such as radishes, diminutive carrots and lettuce, etc.

The present invention also has a novel means of protecting the plants from cold wind and low temperatures, by having a cone-shaped plastic or fabric covering to cover the plurality of strings supported by the hook-like elements on the outer edges of the pole cap and the hook-like elements on the outer walls of the growing cavity; a space between the top of the plastic or fabric covering and the pole cap releases any build-up of heat. The plastic or fabric covering can be installed or removed when needed in a matter of minutes by integral elastic bands attached to the top and bottom ends of the cone-shaped plastic or fabric covering. The elastic bands are supported by the hook-like elements on the pole cap and the hook-like elements on the outer walls of the planter.

Unlike other planters currently on the market, this present invention is capable of growing and vertically supporting various vine type plants as well as other smaller plants in a growing medium that is self-watered. With gardening becoming ever so popular there are many people in urban areas that like to garden but are limited to confined spaces such as small backyards, decks and balconies, etc. Many people in such confined spaces use different types of planters, some are self watering, others are just any type of container that is suitable to hold soil. Finding and securing supports for vine type plants can be a great inconvenience, and for decks and balconies this can be very difficult to accomplish. A problem when growing in non self-watering planters is that the growing medium can dry out in a matter of hours during hot days. This would present a problem for gardeners who would be absent from their homes during the day.

This present invention is octagon shaped with a growing cavity surrounding a reservoir with a vertical support for vine type plants. The octagon shaped growing cavity can accommodate numerous vine type plants as well as support each plant individually without requiring much space. This invention is a real time and space saver for busy gardeners with its self-watering and vertical supporting mechanisms. It can also accommodate casters for ease of movement on decks and balconies. It will produce an abundance of fruit and vegetables and will be attractive in any backyard and on any deck or balcony. This invention can be fabricated from plastic and is designed to be shipped in a reasonably small package. It is easily assembled by the consumer without tools, and disassembled for storage when not in use

OBJECTS OF THE INVENTION

The principal object of the present invention is to provide an octagon shaped planter, having a self-watering and vertical supporting mechanism for growing and supporting vine type plants such as peas, beans, cucumbers and tomatoes.

Still another object of the invention is to provide a small mesh, elongated octagon shaped net to convert the planter in a matter of minutes for growing vine type plants that can be closely spaced such as peas. With this conversion there is ample space for growing other plants such as radishes, diminutive carrots and lettuce adjacent to the peas.

It is yet another object of the invention to provide a cone-shaped plastic or fabric covering that can be easily installed or removed when necessary to protect the plants from cold wind and low temperatures.

DETAILED DESCRIPTION OF THE INVENTION

Figure 1:
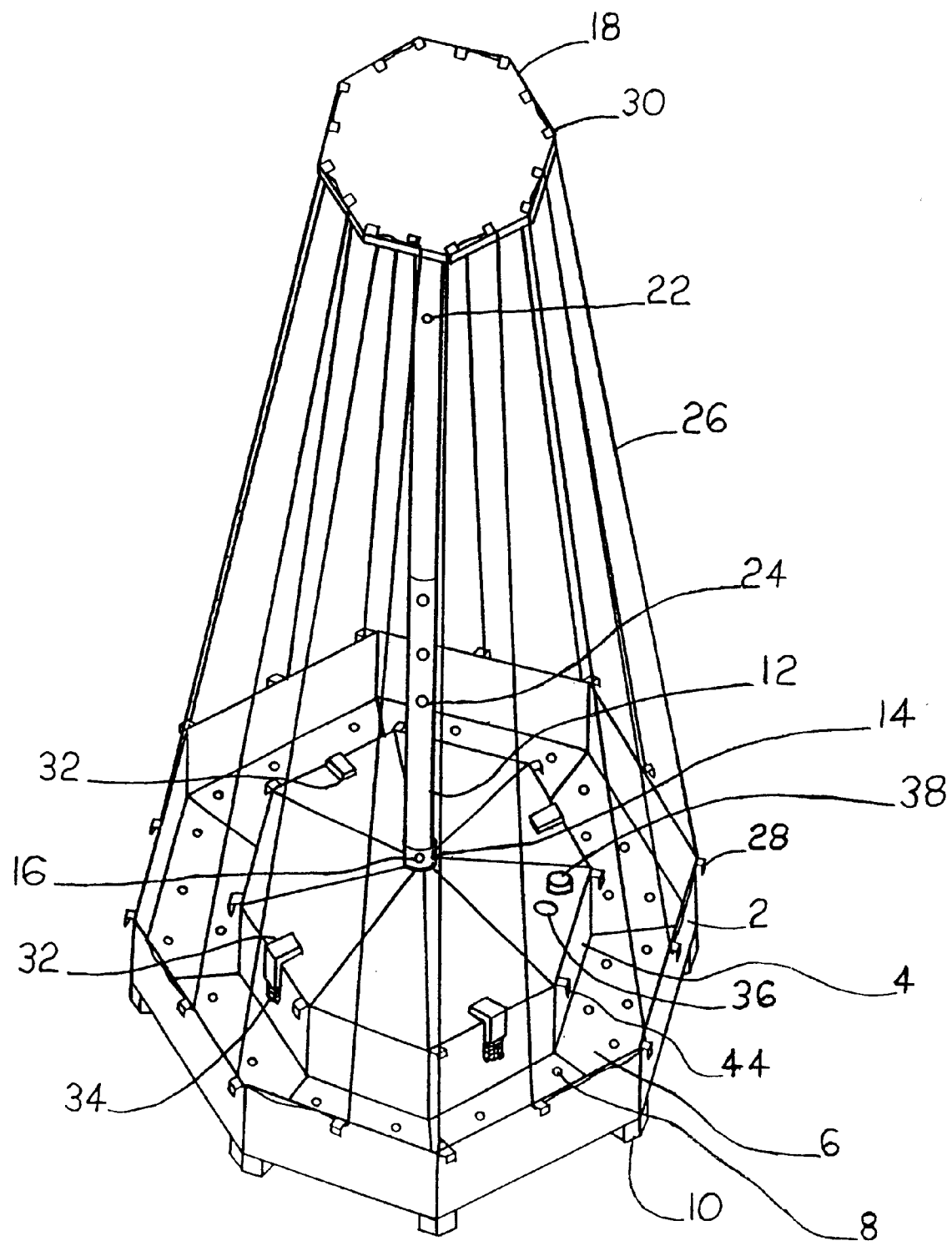
FIG. 1 is a perspective view looking generally from the front of a preferred embodiment of a self-watering vertical supporting planter, the present invention.

Reference is made firstly to FIG. 1 which illustrates a self-watering vertical supporting growing planter having outer walls 2 attached to reservoir 4 by means of bottom 6. Said bottom 6 has a plurality of perforations 8 for drainage and air circulation. Said bottom 6 also has a plurality of resting supports 10.

Figure 3:
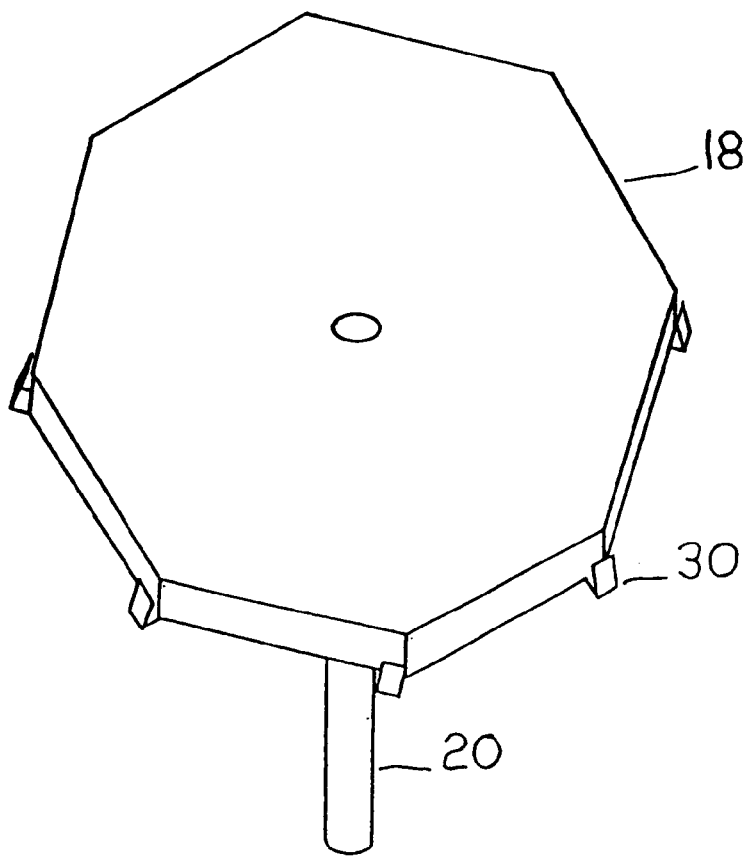
FIG. 3 is a perspective view of the pole cap and pole cap support showing a detailed view of the hook-like elements for supporting the plurality of strings.
Figure 4:
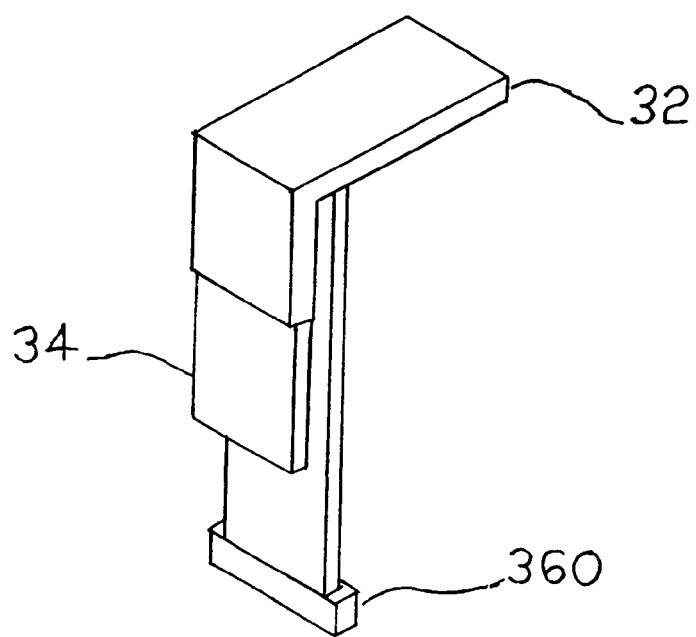
FIG. 4 is a perspective enlarged view of the wick cap and the wick showing the weight attached to the end of the wick that goes into the reservoir.

Said resting supports 10 have means to accommodate removable casters. Vertical telescopic support pole 12 is coupled to said reservoir 4 by means of coupling sleeve 14. Locking pin 16 prevents said vertical support pole 12 from rotating in said coupling sleeve 14. Pole cap 18 is coupled to vertical support pole 12 by means of pole cap support 20 as seen in FIG. 3. Locking pin 22 prevents said pole cap 18 from rotating in support pole 12. Said vertical support pole 12 is telescopic with adjusting holes 24 and adjustment locking pin not shown. Said pole cap 18 and said planter outer walls 2 are connected by a plurality of strings 26. Said strings 26 are in a continuous length, looping around hook-like elements 28 on said outer walls 2 and hook-like elements 30 on said pole cap 18 to form the said plurality of strings 26 for supporting plants.

A growing medium is contained in a cavity formed between said outer walls 2, said reservoir walls 4 and said bottom 6. The growing medium is watered by means of wick caps 32 and wicks 34 attached to the walls of said reservoir 4. Said wicks 34 are inserted in said reservoir 4 by means of wick ports in the top of the reservoir. Said wicks 34 having a weight 36 attached to the end inserted in the reservoir. Said weights 36 on wicks 34 will keep said wicks on the bottom of said reservoir 4 for the maximum absorption of the water contained in the reservoir. Said wick caps 32 are attached to the top of said reservoir 4 and are easily removed for changing or adjusting the wicks. Said wick caps 32 will prevent the top portion of said wicks 34 from drying out due to evaporation. The vertical portion of said wick caps 32, protruding in the top portion of the growing medium, directs the water to the lower portion of the growing medium near the root zone where it is needed the most. Said reservoir 4 is filled with water and soluble fertilizer when necessary by means of filler hole 36 and filler hole stopper 38.

Figure 2:
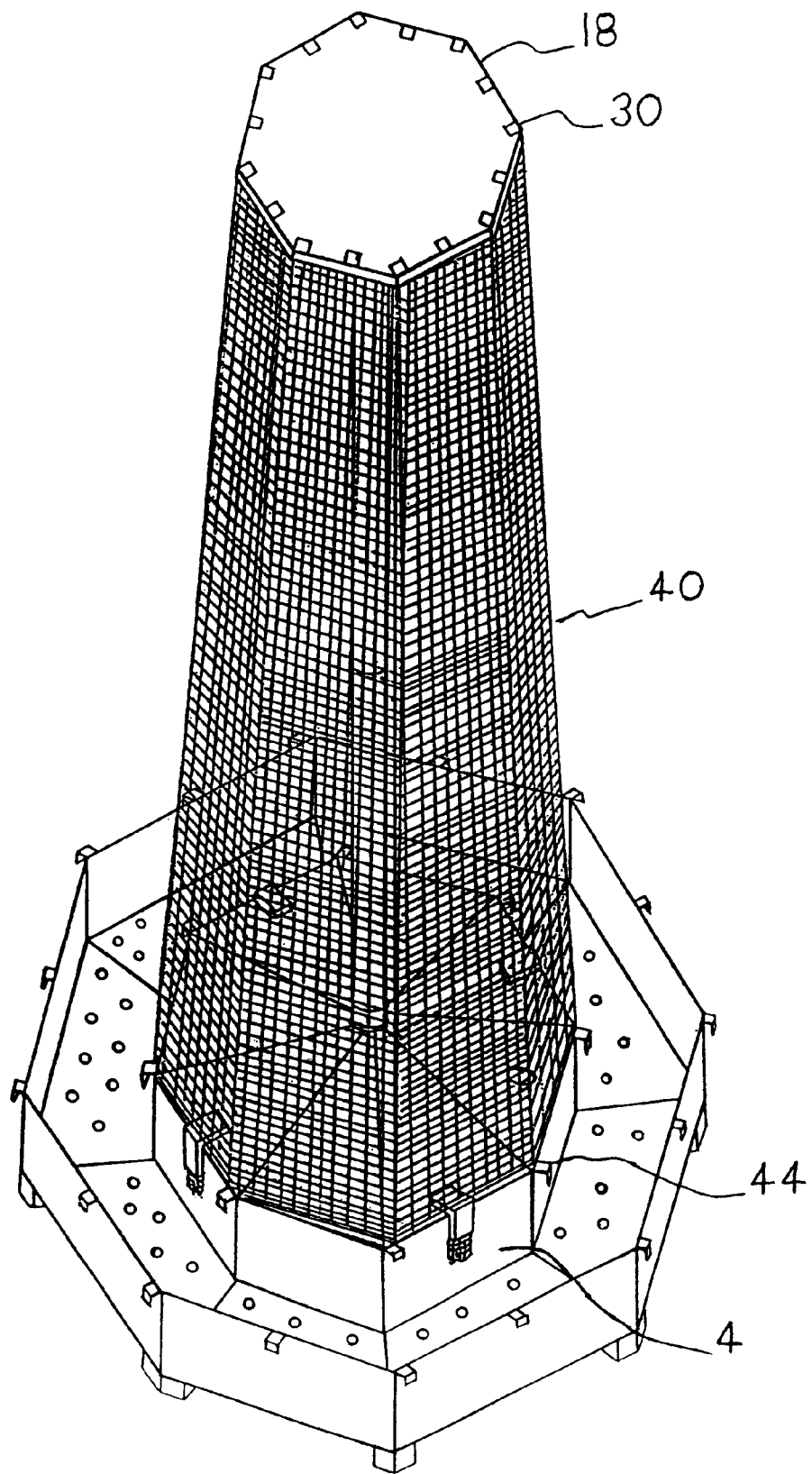
FIG. 2 is a perspective view of the planter looking generally from the front showing a small mesh, elongated octagon shaped net for supporting plants such as peas.

Another embodiment of the invention as shown in FIG. 2 is a small mesh, elongated octagon shaped net 40 vertically supported by said hook-like elements 30 on said pole cap 18 and said hook-like elements 44 on reservoir 4. Said mesh net 40 is best suited for supporting peas or similar type plants of the tall variety. With the bottom of said mesh net 40 supported from said reservoir 4 by means of said hook-like elements 44, the peas can be planted in close proximity to the walls of said reservoir 4. This procedure for growing peas leaves ample space in the growing medium to have another crop of smaller plants adjacent to the peas such as radishes, diminutive carrots and lettuce, etc. This method will utilize all of the growing medium.

Another embodiment of this invention, not shown, is a type of plastic or fabric, covering the outer portions of the plurality of said strings 26 shown in FIG. 1. This covering has elastic bands at its top and bottom ends for attaching it to said hook-like elements 28 on said outer walls 2 in FIG. 1, and said hook-like elements 30 on said pole cap 18 also shown in FIG. 1. The covering will end below said pole cap 18 to allow for ventilation. When the covering is attached it will give the planter a greenhouse effect and will help lengthen the growing season.

Another embodiment of this invention, not shown, is a plurality of removable casters supported by said resting supports 10, said casters are used for easy movement of the planter to or from different locations.

Figure 5:
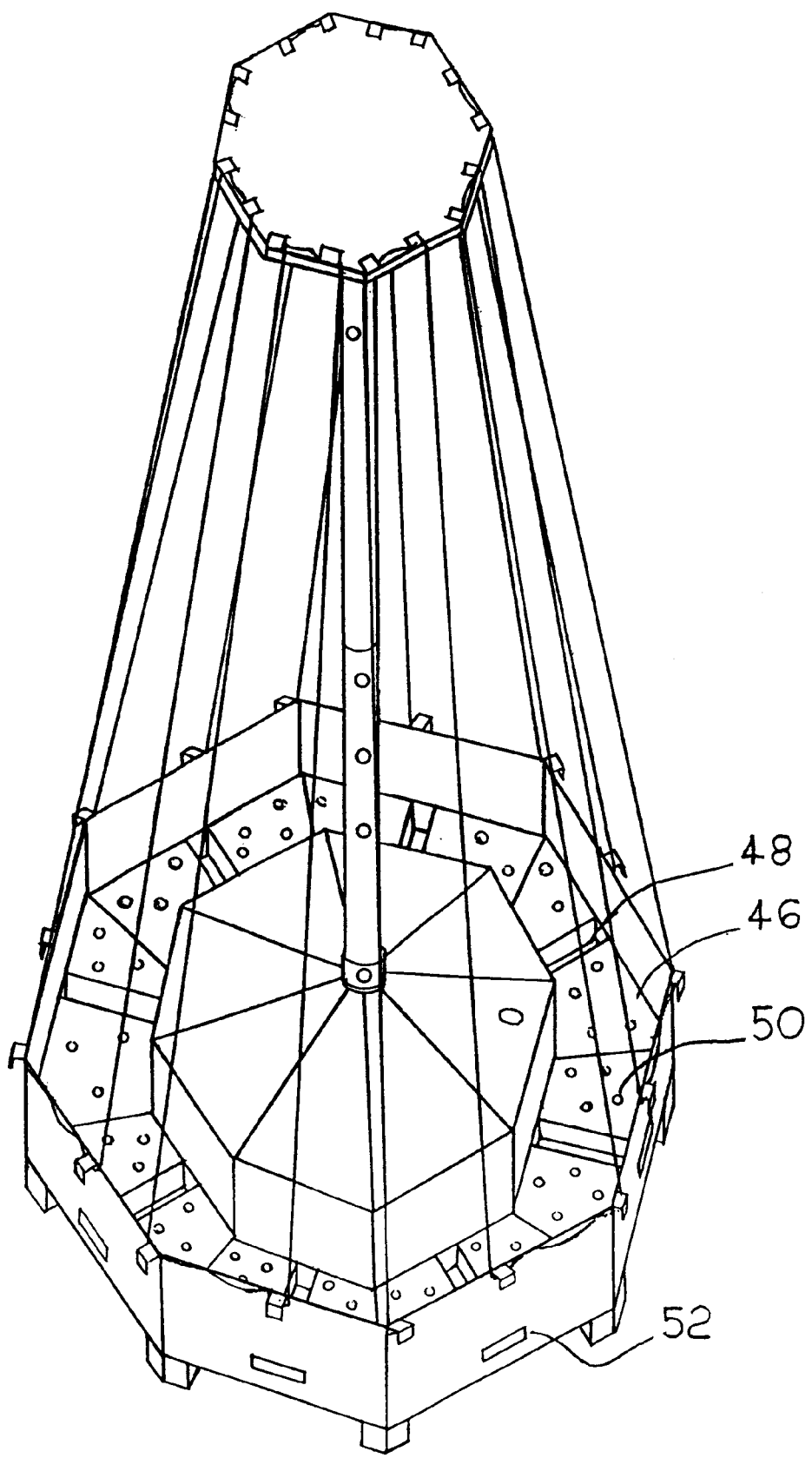
FIG. 5 is a perspective view of the planter looking generally from the front showing an alternative watering system.
Figure 6:
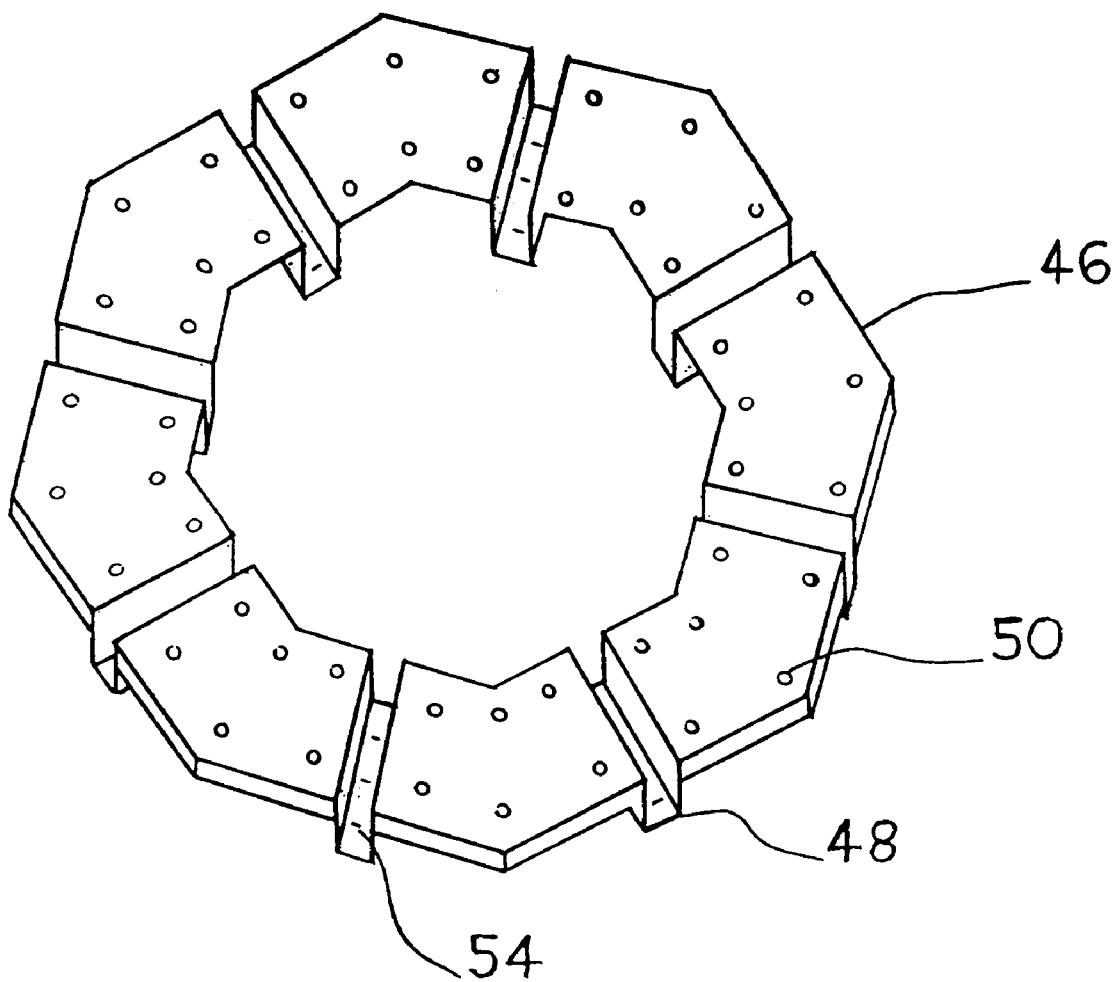
FIG. 6 is a perspective view of the raised bottom as shown in the alternative watering system in FIG. 5.

Another embodiment of this invention as shown in FIG. 5 is a self-watering vertical supporting planter having a water tight bottom integral of said outer walls 2 and said reservoir 4. The growing medium is contained in a cavity formed between said outer walls 2, said reservoir walls 4, and raised bottom 46 having integral hollow supports 48. Said raised bottom 46 has a plurality of perforations 50 for drainage and air circulation and the integral hollow supports 48 have a plurality of perforations 54 in the bottom area shown in FIG. 6 for watering the growing medium by capillary action. Said outer walls 2 have a plurality of perforations 52 around its entire perimeter at a level lower than said raised bottom 46. Said perforations 52 will determine the maximum water level in the planter from rain water or other sources as well as provide sufficient air circulation for the plants roots. Said reservoir walls 4 will have a plurality of perforations, not shown in the drawing, in the bottom edges of the walls allowing the water to flow into the entire lower portion of the planter. The entire growing medium will be watered by its own capillary action from the growing medium in said hollow supports 48. Said hollow supports 48 rest on the watertight bottom of the planter supplying an adequate amount of water or other fluids to the growing medium through perforations 54 shown in FIG. 6. Excess water going into the planter due to overwatering or rain water will drain out through said perforations 52 preventing the growing medium from becoming saturated.

I claim:

1. A self-watering vertical supporting growing planter comprising: a planter with outer walls and a reservoir forming inner walls; a bottom having a plurality of perforations for drainage and air circulation connecting said outer walls and said reservoir to form a growing cavity to hold a growing medium to support the growth of plants; a plurality of rest supports fixed to the exterior of said bottom with means of accommodating removable casters; said reservoir has its top inclined from the outer top edges to a sleeve in the top centre, extending through to a bottom centre providing means for holding a vertical support; said reservoir has a filler hole and stopper; said reservoir has a plurality of slow-releasing wicks to deliver fluid to the growing medium.

2. A self-watering vertical supporting growing planter as claimed in claim 1, wherein the vertical support comprises: an adjustable telescopic pole with adjustment locking pin, and locking pins at the top and bottom to prevent the pole and its attachment from rotating; a pole cap attached to the top end of said telescopic pole, providing a plurality of hook-like elements on the outer edges of said pole cap to accommodate a plurality of strings, supported by a plurality of hook-like elements on said outer walls of the growing cavity.

3. A self-watering vertical supporting growing planter as claimed in claim 1, in which a small mesh, elongated octagon shaped net is supported by a plurality of hook-like elements on said outer walls of the reservoir and the plurality of hook-like elements on said outer edges of a pole cap.

4. A self-watering vertical supporting growing planter as claimed in claim 1, wherein a plurality of wicks are inserted in said reservoir through a plurality of wick caps and wick ports; the wick ends inserted in said reservoir have a weight attached to keep said wick ends resting on the bottom of the reservoir; the opposite ends of said wicks hang over the outer walls of said reservoir extending part way to the bottom of said growing cavity, said wick caps are attached to the top outer edges of said reservoir covering said wick ports to eliminate evaporation; a portion of each of said wick caps extends down the outer walls of the reservoir covering the top portion of said wicks, directing the fluid released from said wicks to the lower portion of the growing medium near the root zone.

5. A self-watering vertical supporting planter as claimed in claim 1, wherein the planter comprises: a watertight bottom; a plurality of perforations in the bottom edges of the reservoir walls for distributing a slow release of water or other fluids throughout the planter; a plurality of perforations along the lower entire perimeter of the outer walls of the planter for determining the maximum water level in the planter and for drainage and air circulation; a growing cavity formed between said outer walls of the planter, said walls of the reservoir and said integral watertight bottom; said growing cavity has a raised bottom with a plurality of perforations for drainage and air circulation and said raised bottom has a plurality of integral hollow supports resting on said watertight bottom of said growing cavity; said integral hollow supports have a plurality of perforations for watering the growing medium by capillary action; said raised bottom and said integral hollow supports are not fixed to said watertight bottom of said growing cavity.

* * * * *